(12) United States Patent
Nakahara et al.

(10) Patent No.: US 8,787,137 B2
(45) Date of Patent: Jul. 22, 2014

(54) OPTICAL PICKUP DEVICE AND OPTICAL DISC DEVICE

(75) Inventors: Hironori Nakahara, Tokyo (JP);
Toshiya Matozaki, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/978,160

(22) PCT Filed: Jan. 17, 2012

(86) PCT No.: PCT/JP2012/000235
§ 371 (c)(1),
(2), (4) Date: Jul. 3, 2013

(87) PCT Pub. No.: WO2012/098859
PCT Pub. Date: Jul. 26, 2012

(65) Prior Publication Data
US 2013/0286810 A1 Oct. 31, 2013

(30) Foreign Application Priority Data
Jan. 20, 2011 (JP) .................... 2011-009915

(51) Int. Cl.
*G11B 7/135* (2012.01)
(52) U.S. Cl.
USPC .................................. 369/112.29
(58) Field of Classification Search
None
See application file for complete search history.

(56) References Cited

U.S. PATENT DOCUMENTS

| | | | | |
|---|---|---|---|---|
| 5,367,399 A | * | 11/1994 | Kramer | 359/206.1 |
| RE40,330 E | * | 5/2008 | Ueno et al. | 428/64.1 |
| 7,656,775 B2 | | 2/2010 | Mori et al. | |
| 7,664,005 B2 | | 2/2010 | Kimura et al. | |
| 7,778,141 B2 | * | 8/2010 | Seo et al. | 369/112.16 |
| 2002/0071377 A1 | * | 6/2002 | Ogata | 369/112.24 |
| 2003/0103276 A1 | * | 6/2003 | Togashi et al. | 359/754 |
| 2005/0201248 A1 | * | 9/2005 | Kitabayashi et al. | 369/112.01 |
| 2006/0077807 A1 | * | 4/2006 | Jutte | 369/44.37 |
| 2013/0286810 A1 | * | 10/2013 | Nakahara et al. | 369/112.23 |

FOREIGN PATENT DOCUMENTS

| | | |
|---|---|---|
| JP | 2-123722 U | 10/1990 |
| JP | 5-314532 A | 11/1993 |
| JP | 9-44887 A | 2/1997 |
| JP | 11-96587 A | 4/1999 |
| JP | 2000-322760 A | 11/2000 |
| JP | 2006-164493 A | 6/2006 |
| JP | 2008-135097 A | 6/2008 |

* cited by examiner

*Primary Examiner* — Peter Vincent Agustin
(74) *Attorney, Agent, or Firm* — Birch, Stewart, Kolasch & Birch, LLP

(57) ABSTRACT

An optical pickup device includes a laser light source 201, a collimating optical system 202 for converting laser light to parallel light, a focusing optical system 205 for focusing the parallel light onto an optical disc, a light detection unit for receiving returning light returning by reflection of the focused light from the optical disc 101 and outputting a detection signal, and a reflecting mirror 204 disposed between the collimating optical system and the focusing optical system. The reflecting mirror 204 has a reflective surface including three regions having different reflectances. The central region on the reflecting surface meets the other two regions, at positions illuminated by the light focused by the light focusing optical system, in boundary lines that are parallel to a radial direction on the optical disc 101. The reflectance of the central region is lower than the reflectances of the other two regions.

4 Claims, 8 Drawing Sheets

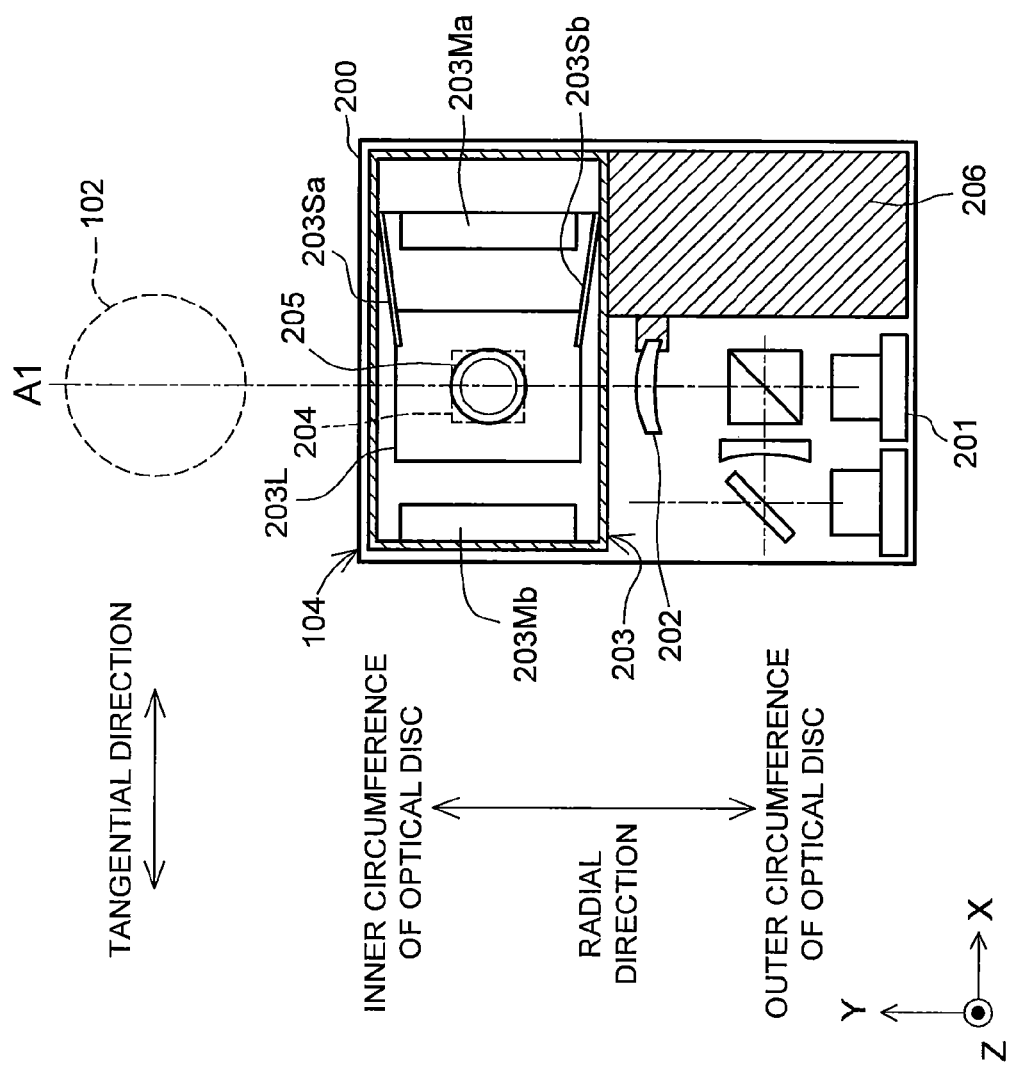
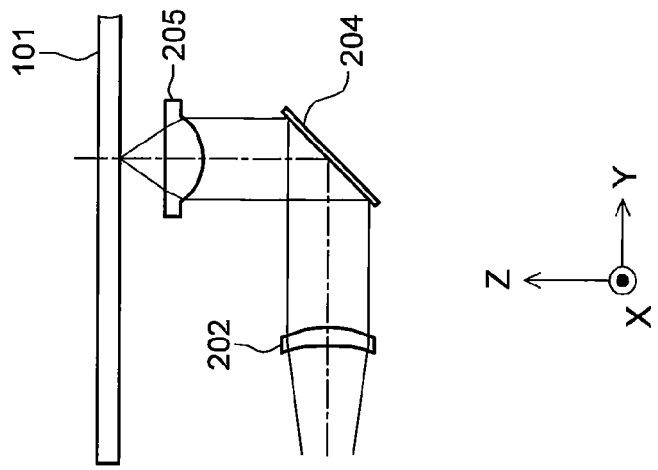
FIG. 2(a)
FIG. 2(b)

OPTICAL PICKUP DEVICE AND OPTICAL DISC DEVICE

TECHNICAL FIELD

The present invention relates to an optical pickup device and an optical disc device equipped therewith.

BACKGROUND ART

Optical discs such as the CD (Compact Disc: registered trademark), DVD (Digital Versatile Disc: registered trademark), or BD (Blu-ray Disc: registered trademark) are in wide use, ranging from industrial to consumer use, because they can provide relatively inexpensive high-capacity information recording media on which information can be recorded and reproduced without contact. Optical disc capacity can be increased by reducing the size of the recording marks (including pits and phase-change marks) formed in the track-like or spiral recording tracks on the optical disc; this has been achieved by shortening the wavelength of the laser beam used in recording and reproduction and increasing the numerical aperture (NA) of the objective lens, thereby reducing the size of the focused spot on the focal plane, in keeping with the reduced size of the recording marks.

For example, a CD can provide a storage capacity of 650 MB with a disc substrate functioning as a light transmitting layer substantially 1.2 mm thick, a laser beam wavelength of substantially 780 nm, and an objective lens with a 0.45 NA. A DVD can provide a storage capacity of 4.7 GB with a disc substrate functioning as a light transmitting layer substantially 0.6 mm thick, a laser beam wavelength of substantially 650 nm, and a 0.6 NA. The higher density BD can provide a large capacity of 25 GB or more with a thin (substantially 0.1 mm thick) protective layer functioning as a light transmitting layer covering the optical recording layer, a laser beam wavelength of substantially 405 nm, and a 0.85 NA.

The technology of shortening of the laser beam wavelength and increasing of the numerical aperture is reaching its limits, however, making it difficult to advance to greater capacities by the methods that have been used so far. The mainstream trend in development work has therefore become to achieve higher capacity by means of multiple layers, by providing a stacked plurality of recording layers, thereby increasing the amount of recorded information per unit area on the optical disc.

In this type of multiple-layer optical disc, the thickness of the light transmitting layer between the lens and the recording layer on which recording or reproduction takes place varies depending on the recording layer selected, so spherical aberration occurs, degrading recording and reproduction performance. Therefore, in the optical pickup device, a collimator lens is generally disposed between the laser light source and the objective lens, and spherical aberration is corrected by moving the collimator lens.

In the correction of spherical aberration by means of a collimator lens, the more variation there is in the thickness of the light transmitting layer, the more the collimator lens must move. This means that as the number of recording layers increases, the amount of collimator lens movement also increases. A problem is that to provide for the increasing amount of collimator lens movement, the optical pickup device becomes larger in size.

It is possible to reduce the amount of collimator lens movement and still obtain high spherical aberration correction performance by shortening the focal length of the moving collimator lens. In conventional optical pickups, the collimator lens function is implemented by a combination of two lenses, and the amount of movement of these two lenses is reduced (see, for example, Patent Reference 1).

PRIOR ART REFERENCES

Patent References

Patent Reference 1: Japanese Patent Application Publication No. 2006-164493 (p. 5, FIG. 2)

SUMMARY OF THE INVENTION

Problems to be Solved by the Invention

In the conventional method of reducing the amount of collimator lens movement using two lenses, however, further reduction of the size of the optical pickup device is difficult because of the thickness of the lenses themselves.

This invention addresses the above problem with the object of providing a small optical pickup device, and an optical disc device, that can reduce the amount of collimator lens movement for correcting spherical aberration in an optical disc with a plurality of information recording layers, and obtain favorable reproduction performance.

Means for Solving the Problem

An optical pickup device according to this invention includes a laser light source, a collimating optical system for converting laser light emitted from the laser light source to parallel light, a focusing optical system for focusing the parallel light to which the laser light is converted onto an optical disc, a light detection unit for receiving returning light returning by reflection, from the optical disc, of the light focused by the focusing optical system and outputting a detection signal, and a reflecting mirror disposed between the collimating optical system and the focusing optical system. The reflecting mirror has a reflecting surface including three regions with differing reflectances. The central one of these regions on the reflecting surface meets the other two regions, at positions illuminated by the light focused by the focusing optical system, in two boundary lines parallel to a radial direction on the optical disc. The reflectance of the central region is lower than the reflectances of the other two regions.

Effect of the Invention

The optical pickup device of this invention can reduce the amount of collimator lens movement for correcting spherical aberration in an optical disc with a plurality of information recording layers, and obtain favorable reproduction performance.

BRIEF DESCRIPTION OF THE DRAWINGS

FIGS. 2(a) and 2(b) are schematic views of an optical pickup device in the first embodiment of this invention.

MODE FOR CARRYING OUT THE INVENTION

First Embodiment

Figure 1:
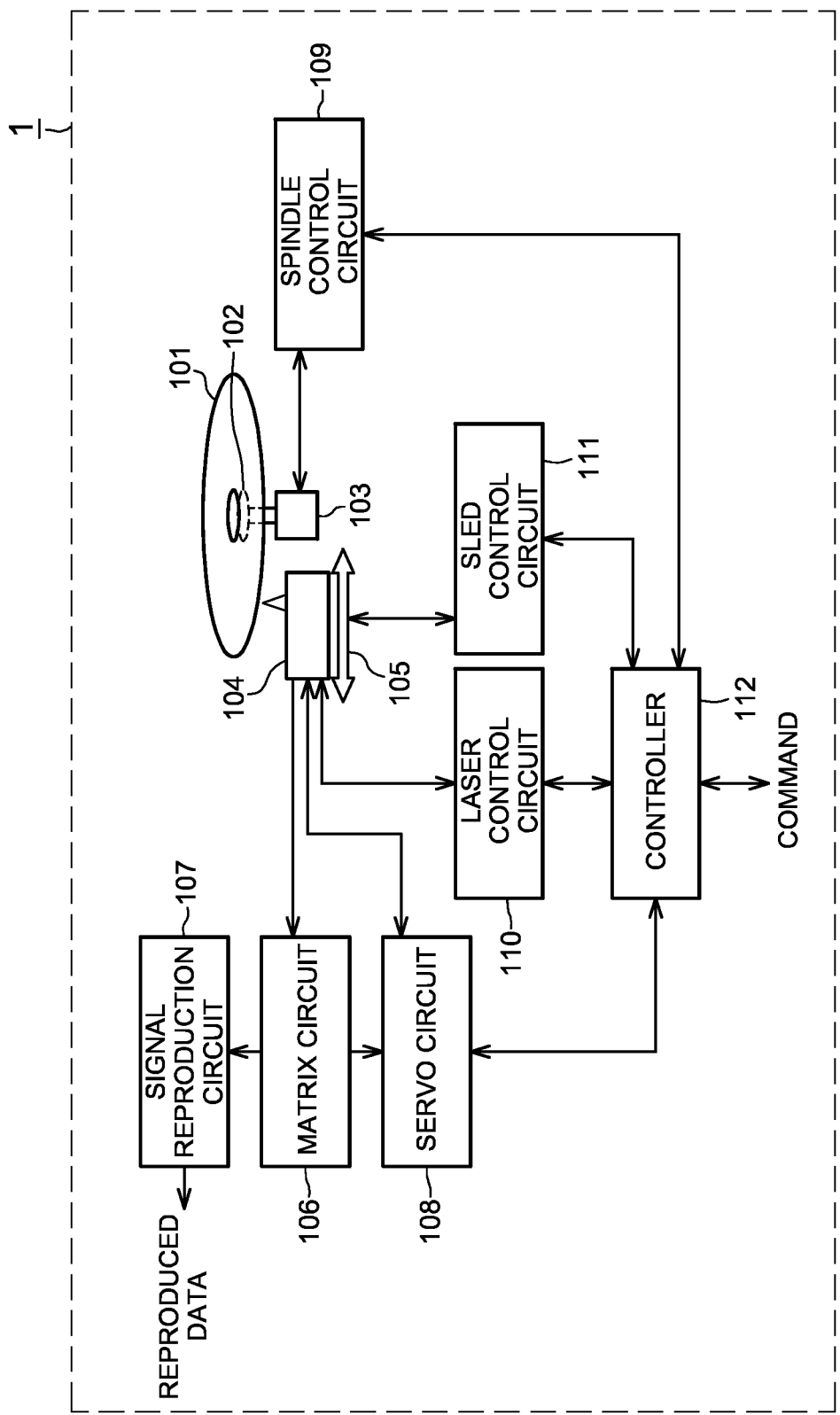
FIG. 1 is a schematic view of an optical disc device in a first embodiment of this invention.

FIG. 1 is a functional block diagram schematically illustrating the structure of an optical disc device 1 in a first mode for carrying out the invention. FIG. 2 is a functional block diagram schematically illustrating the structure of the optical pickup device 104 in the optical disc device 1.

As shown in FIG. 1, the optical disc device 1 has a turntable 102 on which an optical disc 101 is removably placed, a spindle motor 103 that functions as a disc drive for rotationally driving the turntable 102, an optical pickup device 104 that reads recorded information from the optical disc 101, and a sled actuator 105 that shifts the optical pickup device 104 in the radial direction on the optical disc 101 for positioning. The optical disc device 1 also has a matrix circuit 106, a signal reproduction circuit 107, a servo circuit 108, a spindle control circuit 109, a laser control circuit 110, a sled control circuit 111, and a controller 112.

The turntable 102 on which the optical disc 101 is removably placed is secured to the spindle of the spindle motor 103. The optical disc 101 is either a single-layer disc that has a single information recording layer, or a multiple-layer disc that has a plurality of information recording layers. The turntable 102 is rotationally driven by the spindle motor 103, which is driven under the control of the spindle control circuit 109, and turns the optical disc 101. The spindle control circuit 109 operates according to instructions from the controller 112, and executes a spindle servo function so as to match the actual rate of rotation to a target rate of rotation, on the basis of a pulse signal indicating the actual rate of rotation supplied from the spindle motor 103.

The optical pickup device 104 has the function of illuminating the optical disc 101 with laser light when information is reproduced or recorded, receiving returning light returning by reflection from the information recording layer of the optical disc 101, generating a detection signal, and outputting the generated detection signal to the matrix circuit 106. FIGS. 2(a) and 2(b) are schematic views of the optical pickup device 104 in the first embodiment. In FIG. 2(a), the direction toward the center of the turntable 102 corresponds to the inner circumference side of the optical disc, and is defined as the radial direction on the optical disc 101. If the radial direction is regarded as the Y-axis direction, then the tangential direction of the optical disc 101 is defined as the X-axis direction, and the direction perpendicular to the surface of the information recording layer formed in the optical disc 101 is defined as the Z-axis direction.

FIG. 2(a) is a top plan view in which the optical pickup device 104 is seen from the direction (Z-axis direction) perpendicular to the information recording layer in the optical disc 101. FIG. 2(b) is a schematic sectional view in which the optical pickup device 104 is seen from the side (the X-axis direction). As shown in FIGS. 2(a) and 2(b), the optical pickup device 104 has a housing 200 with long sides extending in the radial direction (the Y-axis direction) of the optical disc 101. The optical pickup device 104 also has an optical integrated device 201, a collimator lens 202, which is the collimating optical system, and an objective lens actuator 203.

The optical integrated device 201 has a structure in which a semiconductor laser element (lasing wavelength: substantially 405 nm) that emits laser light for a BD and a light receiving element are integrated on the same substrate. The laser control circuit 110 shown in FIG. 1 drives the optical integrated device 201 and can control the intensity of the laser light emitted from the optical pickup device 104.

The laser light emitted from the optical integrated device 201 enters the light incidence surface of the collimator lens 202. As shown in FIG. 2(b), the collimator lens 202 converts the incident laser light to parallel light.

As shown in FIG. 2(b), a reflex mirror 204 reflects the parallel light entering from the collimator lens 202 in the direction (Z-axis direction) toward an objective lens 205, which is the focusing optical system. The objective lens 205 focuses the light entering from the reflecting surface of the reflex mirror 204 onto the optical disc 101. The objective lens 205 has an NA of substantially 0.85 with respect to laser light for a BD. Exemplary specifications of the objective lens 205 are shown in the following Table 1.

TABLE 1

| Objective lens focal length (mm) | 1.176 |
|---|---|
| NA of objective lens | 0.85 |
| Objective lens pupil diameter φ (mm) | 2.0 |

The optical pickup device 104 also has a collimator lens actuator 206 for correction of optical aberration (mainly, spherical aberration). The collimator lens actuator 206 can appropriately correct optical aberration by shifting the collimator lens 202 in the optical-axis direction (the direction of the dot-dash line A), according to a control signal supplied from the controller 112 through the servo circuit 108. The collimator lens actuator 206 has a stepping motor (not shown) and a guiding system (not shown) that shift the collimator lens 202 in the optical-axis direction. The collimator lens actuator 206 can correct spherical aberration by shifting the collimator lens 202 along the optical axis according to, for example, the thickness of a cover layer covering a specific information recording layer in a multiple-layer disc, or according to manufacturing error in the thickness of the cover layer.

The optical pickup device 104 has a light detection unit (light receiving element) which receives light reflected from the disc and converts the received light to a detection signal.

In FIG. 1, the matrix circuit 106 has a matrix computation circuit and an amplifier circuit. The matrix circuit 106 performs matrix computation processing on the detection signal supplied from the optical pickup device 104, generates a reproduced high-frequency (RF) signal, and generates servo control signals such as a focus error signal and a tracking error signal. The reproduced RF signal generated in the matrix circuit 106 is supplied to the signal reproduction circuit 107. The servo control signals generated in the matrix circuit 106 are supplied to the servo circuit 108.

The signal reproduction circuit 107 carries out a binarizing process on the reproduced RF signal supplied from the matrix circuit 106 to generate a modulated signal. The signal reproduction circuit 107 generates a recovered clock from the generated modulated signal, demodulates and decodes the modulated signal, corrects errors, and generates reproduced data. The reproduced data that are generated in the signal reproduction circuit 107 are transmitted to a host device (not shown) such as an audio-visual device or a personal computer.

The servo circuit 108 generates various types of servo drive signals for focus control and tracking control on the basis of the servo control signals supplied from the matrix circuit 106. The generated servo drive signals are supplied to the objective lens actuator 203 in the optical pickup device 104.

As shown in FIG. 2(a), the objective lens actuator 203 has a lens holder (movable part) 203L that holds the objective lens 205, suspensions 203Sa, 203Sb that support the lens holder 203L, and magnetic circuits 203Ma, 203Mb. The objective lens actuator 203 also has a focus coil and a tracking coil (not shown). The servo drive signals (drive current) supplied from the servo circuit 108 enable the objective lens actuator 203 to shift the objective lens 205 in the focus direction with use of the focus coil and in the radial direction with use of the tracking coil.

In FIG. 1, the sled control circuit 111 can position the optical pickup device 104 by using the sled actuator 105 to shift the optical pickup device 104 in the radial direction on the optical disc 101. The optical pickup device 104 can thereby illuminate the optical disc 101 with laser light, for reproduction or recording, focused onto a desired recording track on the optical disc 101.

The controller 112 controls the operations of the servo circuit 108, spindle control circuit 109, laser control circuit 110, and sled control circuit 111 described above. The controller 112, which is configured with a microcomputer, executes various types of control processing according to commands from the host device (not shown).

Figure 3:
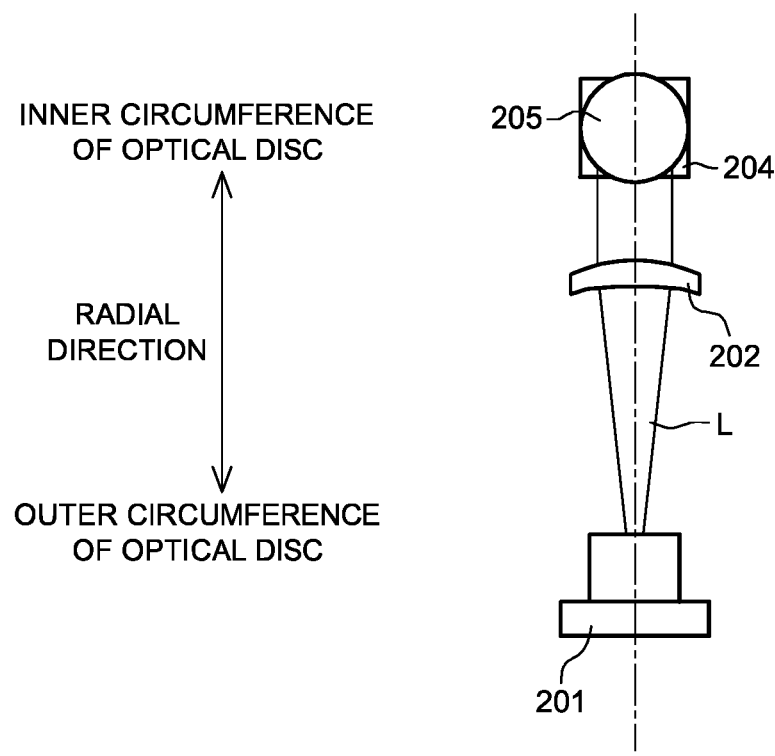
FIG. 3 is a schematic view showing part of the optical pickup device in the first embodiment of this invention.

FIG. 3 is a diagram schematically illustrating the light path in the optical pickup device 104. As shown in FIG. 3, laser light L emitted from the optical integrated device 201 is converted to parallel light by the collimator lens 202. The reflex mirror 204 reflects the parallel light in the direction toward the objective lens 205. The objective lens 205 focuses the light incident from the reflex mirror 204 onto the optical disc 101, forming a focused spot. The returning light returning by reflection from the optical disc 101 passes through the objective lens 205, and is reflected by the reflex mirror 204 in the direction toward the collimator lens 202. The returning light then passes through the collimator lens 202, and is received by the light receiving element (not shown) in the optical integrated device 201.

Figure 4:
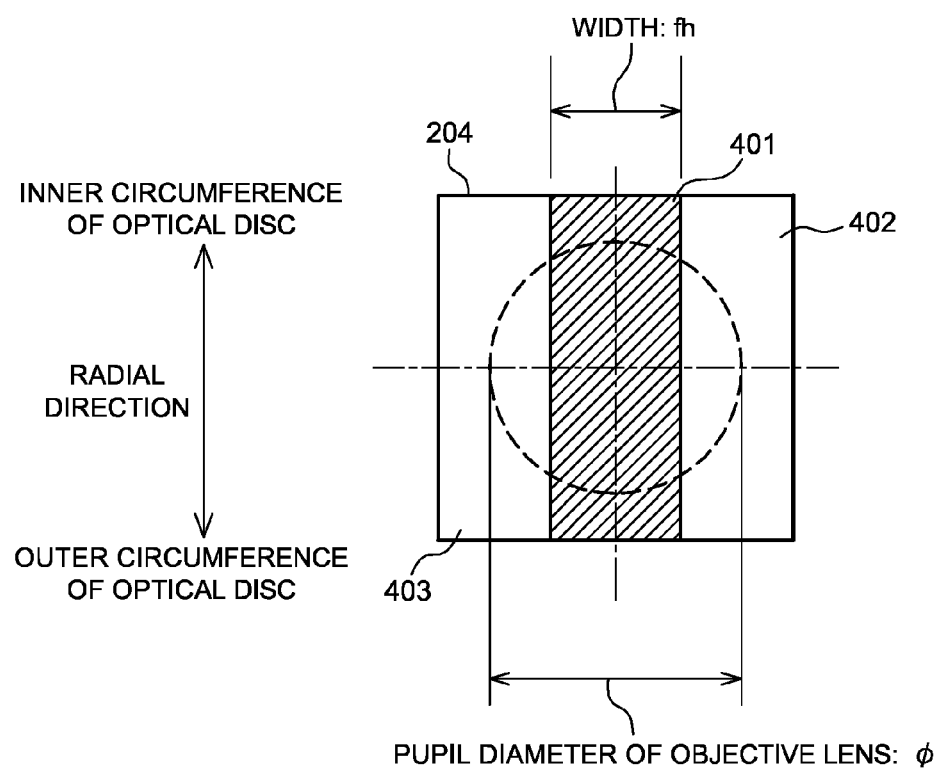
FIG. 4 is a schematic view showing part of the reflex mirror in the optical pickup device in the first embodiment of this invention.

FIG. 4 is a schematic diagram illustrating the reflecting surface, structured with bands of different reflectances, that is formed in the reflex mirror 204 of the first embodiment. As shown in FIG. 4, the reflecting surface of the reflex mirror 204 is divided into rectangular regions 401, 402, and 403 with long sides parallel to the radial direction. The surface structure is such that, when the reflectance of the central region 401 is denoted by Ri and the reflectances of the regions 402 and 403 located outside the central region 401 are both denoted by Ro, the relationship between the reflectance Ri of region 401 and the reflectance Ro of the regions 402 and 403 satisfies Ri/Ro<1. The region 401 is elongate in the radial direction, the width fh of region 401 is less than the pupil diameter φ of the objective lens, and 0<fh/φ<1.

In the first embodiment, in order to reduce the total length of the optical system by reducing the amount of collimator lens movement for spherical aberration correction, The focal length of the collimator lens 202 is adjusted to a focal length shorter than the focal length of collimator lenses in common use. Because the amount of collimator lens movement for spherical aberration correction is proportional to the focal length of the collimator lens 202, to reduce the amount of collimator lens movement, it is advantageous to use a collimator lens with a short focal length. The focal length of the collimator lens 202 is 7.056 mm; the combination of the collimator lens 202 and the objective lens 205 forms an optical system with a 6× magnification or power. When a typical semiconductor laser for a BD is used as the optical integrated device 201, if the power of the optical system is equal to or less than 6×, the rim light intensity is reduced, so the focused spot diameter of the laser light L for a BD on the optical disc 101 cannot be sufficiently reduced and the quality of signals reproduced from short recording marks on the optical disc 101 is degraded, making it difficult to obtain the desired reproduction performance.

Figure 5:
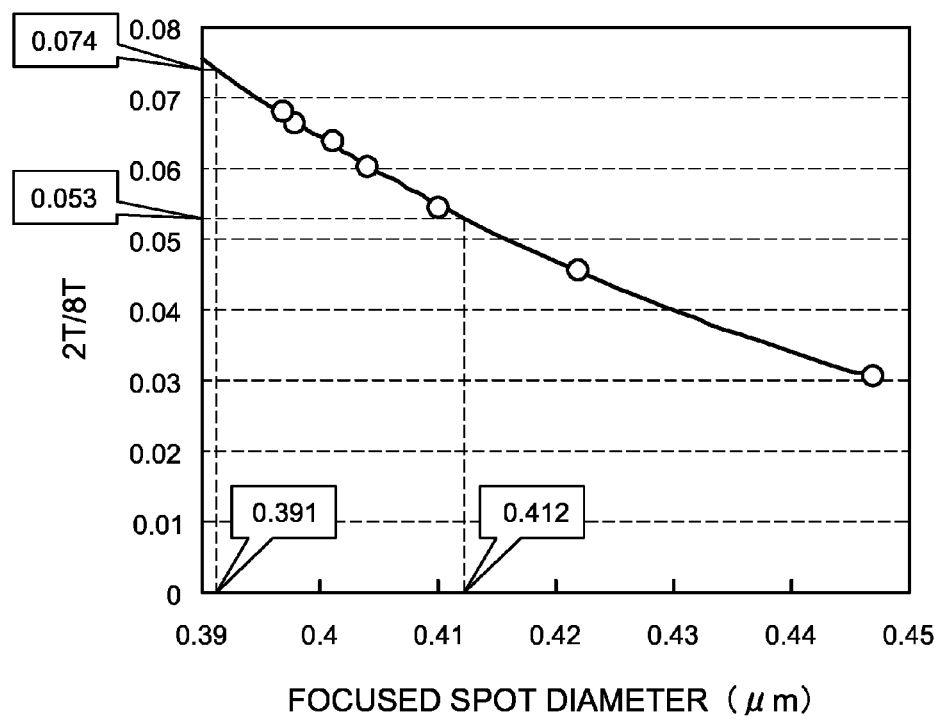
FIG. 5 is a graph showing the relation between focused spot diameter and recording mark resolution in the optical pickup device in the first embodiment of this invention.

FIG. 5 is a graph showing the relation between focused spot diameter and recording mark resolution in the first embodiment. FIG. 5 shows simulated results for the 2T/8T amplitude ratio, which indicates short recorded mark resolution with respect to the focused spot diameter in the tangential direction. In the graph, T denotes the recorded mark length; if, for example, a BD has a storage capacity of 25 GB per layer at 1× speed with a clock frequency of 66 MHz, then T=0.149 µm. The amplitude ratio 2T/8T is the ratio of the amplitude of the reproduced signal when a 2T mark is reproduced, to the amplitude of the reproduced signal when an 8T mark is reproduced; a 2T mark is the recorded mark with the shortest length used for a BD; an 8T mark is the recorded mark with the longest length used for a BD; a higher ratio represents better signal quality, indicating that the 2T signal (the signal for a 2T mark) can be read well. The 2T/8T amplitude ratio is commonly used for relative evaluation of the 2T signal, excluding the effect of the variation in light intensities of the light spot.

It is commonly known that when the wavelength of the laser light is denoted by λ and the numerical aperture of the objective lens is denoted by NA, the ideal focused spot diameter is given by the following equation (1).

[Mathematical expression 1]

$$\text{Focused spot diameter}(\phi)=0.82\lambda/NA \quad (1)$$

The focused spot diameter is defined as the beam width at which the light intensity is exp(−2) times the central intensity in the light intensity distribution of the focused spot. When λ is 405 nm and NA is 0.85, from equation (1), the ideal focused spot diameter is 0.391 µm. This is the minimum limit diameter of the focused spot diameter.

When the focused spot has the minimum limit diameter of 0.391 µm, from an approximation curve obtained from the simulated result shown in FIG. 5 and represented by equation (2) (x: focused spot diameter in µm, y: 2T/8T amplitude ratio), the 2T/8T amplitude ratio is 0.074.

[Mathematical expression 2]

$$y=37.3\exp(-15.9x) \quad (2)$$

When the 2T/8T amplitude ratio obtained from the ideal focused spot diameter is 0.074, if the limit of the 2T/8T amplitude ratio at which favorable reproduction can be obtained from a BD is 0.053, which is 3 dB less than the 2T/8T amplitude ratio of 0.074, since the approximation curve given by equation (2) gives a focused spot diameter of 0.412 μm at this ratio, the limit of the focused spot diameter at which favorable reproduction can be obtained from a BD was taken to be 0.412 μm. The reason why the limit of the 2T/8T amplitude ratio at which favorable reproduction can be obtained from a BD was reduced by 3 dB is as follows. When the quality of the focused spot is degraded and the spot diameter increases, the amplitude of the 2T signal is reduced, also reducing the 2T/8T amplitude ratio. When the reproduced signal is converted to a data string, although read errors are more likely to occur with the reduced 2T/8T amplitude ratio, the read errors can be corrected, so a moderate reduction in the 2T/8T amplitude ratio is tolerable. The range of tolerable reduction in the 2T/8T amplitude ratio differs according to the state of the signal transmission line and the error correction method, making it difficult to select a single value. In the first embodiment, a 2T/8T amplitude ratio 3 dB less than that in the ideal state was selected as a provisional limit value.

The focused spot diameter is related to the rim light intensity, which is one of the standard evaluation criteria of an optical disc. The rim light intensity is defined as the ratio $(I_e/I_{max})$ of the light intensity $(I_e)$ at the edge of the pupil of the objective lens to the maximum light intensity $(I_{max})$ in the pupil. The rim light intensity is also related to the beam divergence angle of the laser light emitted from the semiconductor laser element. If the beam divergence angle of the laser light is denoted by θ, the pupil diameter (diameter) of the objective lens 205 is denoted by φ, and the focal length of the collimator lens 202 from which the light enters the objective lens 205 is denoted by f, then the rim light intensity $I_{RIM}$ (unit: percent) is given by the following equation (3).

[Mathematical expression 3]

$$I_{RIM} = 100 \cdot \exp\left[-2\left(\frac{\phi\sqrt{0.5 \cdot \ln(2)}}{2 \cdot f \cdot \tan\left(\theta \cdot \frac{\pi}{360}\right)}\right)^2\right] \quad (3)$$

Figure 6A:
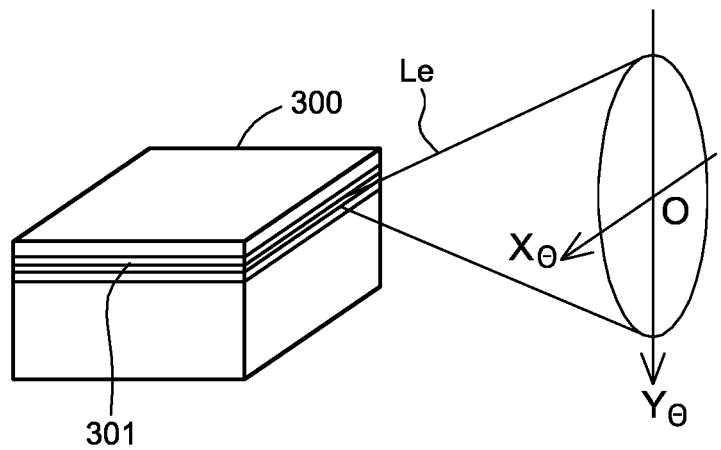
FIGS. 6(a) to 6(c) are schematic diagrams illustrating the beam divergence angle in the optical pickup device in the first embodiment of this invention.
Figure 6B:
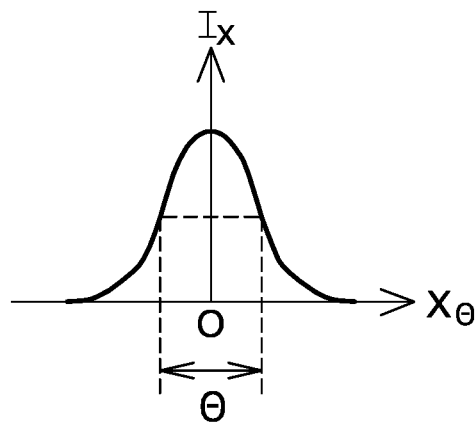
Figure 6C:
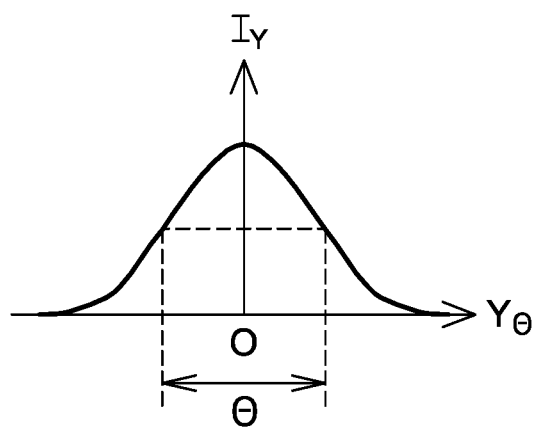

FIGS. 6(a) to 6(c) are schematic diagrams illustrating the beam divergence angle of laser light emitted from the semiconductor laser in the first embodiment. FIG. 6(a) shows the beam divergence angle of laser light Le emitted from the active layer 301 of a semiconductor laser 300; FIGS. 6(b) and 6(c) show the intensity distribution in the far field pattern (FFP) of the laser light Le emitted from the active layer 301. As shown in FIGS. 6(b) and 6(c), the beam divergence angle has two types of values $\theta_v$, $\theta_h$. In the light intensity distribution of the far field pattern (FFP) of the laser light Le emitted from the active layer 301 of the semiconductor laser 300, beam divergence angle $\theta_h$ represents the full width at half maximum of the light intensity distribution $I_x$ (angular width at which the light intensity $I_x$ has 50% of the maximum value) in the $X_\theta$ direction parallel to the light emitting facet of the active layer 301, as shown in FIG. 6(a), and beam divergence angle $\theta_v$ refers to full width at half maximum of the light intensity distribution $I_y$ (angular width at which the light intensity $I_y$ has 50% of the maximum value) in the $Y_\theta$ direction parallel to the light emitting facet of the active layer 301, as shown in FIG. 6(b).

Figure 7:
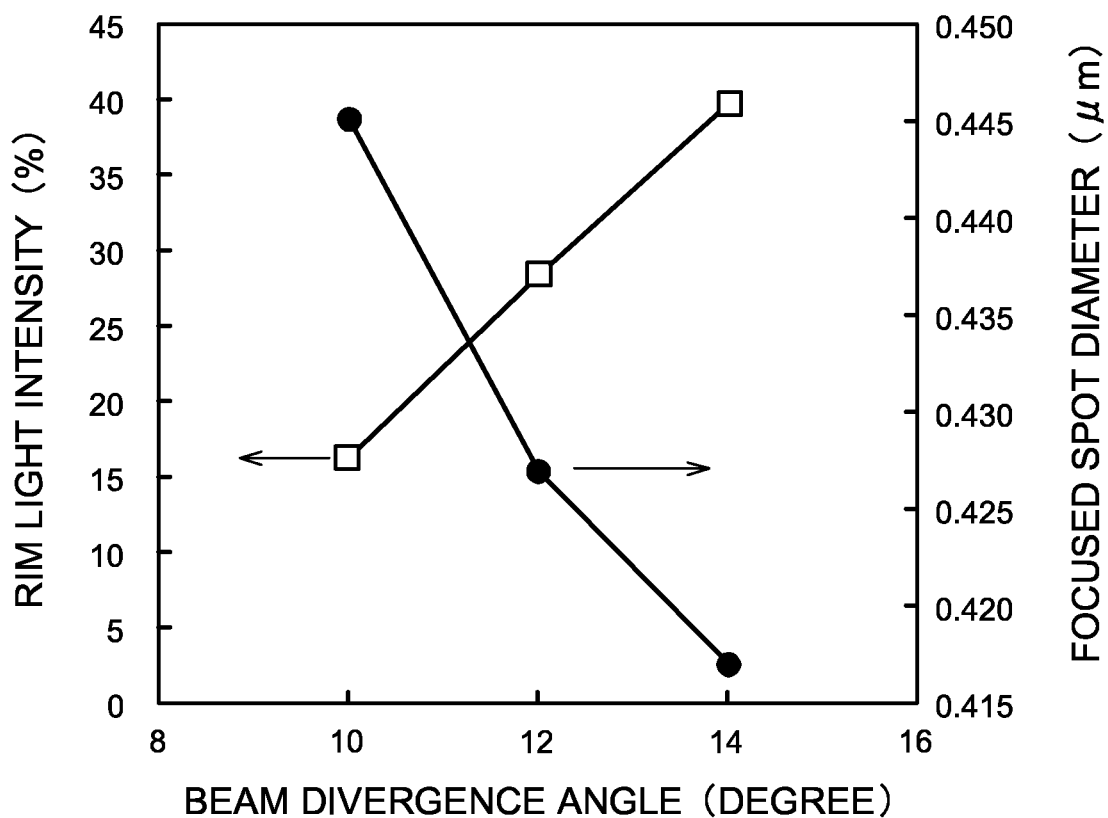
FIG. 7 is a graph showing the relation of rim light intensity and focused spot diameter to the beam divergence angle of the semiconductor laser device in the optical pickup device in the first embodiment of this invention.

FIG. 7 is a graph showing the relation of rim light intensity and focused spot diameter to the beam divergence angle of the semiconductor laser element in the first embodiment. The plot shown with black dots in FIG. 7 indicates the relation between focused spot diameter and the beam divergence angle; the plot shown with squares indicates the relation between rim light intensity and the beam divergence angle. FIG. 7 shows the relation of rim light intensity and focused spot diameter to the beam divergence angle of the semiconductor laser element when the power of the optical system is 6×. When the reflex mirror 204 is an ordinary reflex mirror with a non-distributed reflectance on its reflecting surface, that is, when Ri/Ro=1, if the beam divergence angle is 12 degrees, the rim light intensity is 28.4%. The focused spot diameter is then 0.427 μm, which is greater than the limit focused spot diameter of 0.412 μm at which favorable reproduction can be obtained from a BD.

Figure 8:
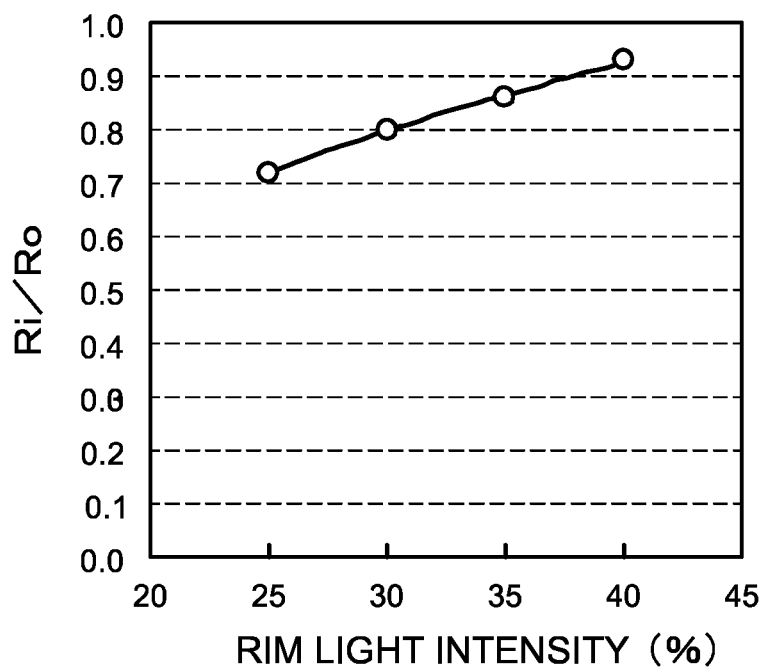
FIG. 8 is a graph showing the relation between rim light intensity and Ri/Ro in the optical pickup device in the first embodiment of this invention.

FIG. 8 is a graph showing the relation between rim light intensity obtained from simulation and Ri/Ro, when the focused spot has the limit diameter of 0.412 μm at which favorable reproduction can be obtained from a BD. When the focused spot diameter is 0.412 μm, the approximation curve showing the relation between rim light intensity and Ri/Ro is represented by equation (4) (x: rim light intensity (%), y: Ri/Ro).

[Mathematical expression 4]

$$y = 0.44 \cdot \ln(x) - 0.70 \quad (4)$$

If the reflex mirror 204 is an ordinary reflex mirror (Ri/Ro=1), because the rim light intensity is reduced, the focused spot diameter increases. On the other hand, if the Ri/Ro value of the reflex mirror 204 is below the approximation curve shown in FIG. 8, represented by equation (4), the focused spot diameter can be brought below 0.412 μm. For example, if the beam divergence angle is 12 degrees and the rim light intensity when an ordinary mirror is used is 28.4%, then from the approximation represented by equation (4), the focused spot diameter can be made less than 0.412 μm by designing the reflex mirror 204 to satisfy Ri/Ro<0.77. The approximation represented by equation (4) was obtained from simulation on the condition that fh/φ=0.5.

As described above, even when a collimator lens with a focal length shorter than the focal length of the collimator lenses in typical use is employed in order to reduce the size of the optical system by reducing the amount of collimator lens movement for spherical aberration correction, the optical pickup device according to the first embodiment can reduce the focused spot diameter by using a reflex mirror with the reflecting surfaces that have a band structure with regions of different reflectances. Degradation of reproduction performance can therefore be prevented.

Because the reflecting surface of the reflex mirror is divided into three rectangular regions with long sides parallel to the radial direction, the optical pickup device according to the first embodiment can reduce the focused spot diameter in the tangential direction, in which marks and spaces are aligned, so the 2T/8T amplitude ratio can be effectively increased. Reducing the focused spot diameter in the radial direction, orthogonal to the tangential direction, would not increase the 2T/8T amplitude ratio.

Although a rectangular reflex mirror having a reflecting surface including three rectangular regions with differing reflectances is used in the first embodiment, the reflex mirror need not necessarily be rectangular; a circular reflex mirror may be used.

Second Embodiment

Figure 9:
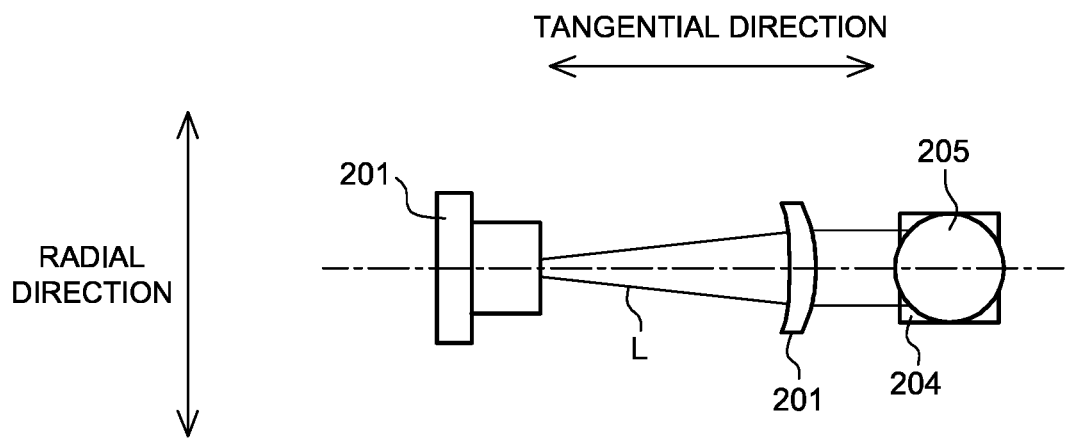
FIG. 9 is a schematic view showing part of the optical pickup device in a second embodiment of this invention.
Figure 10:
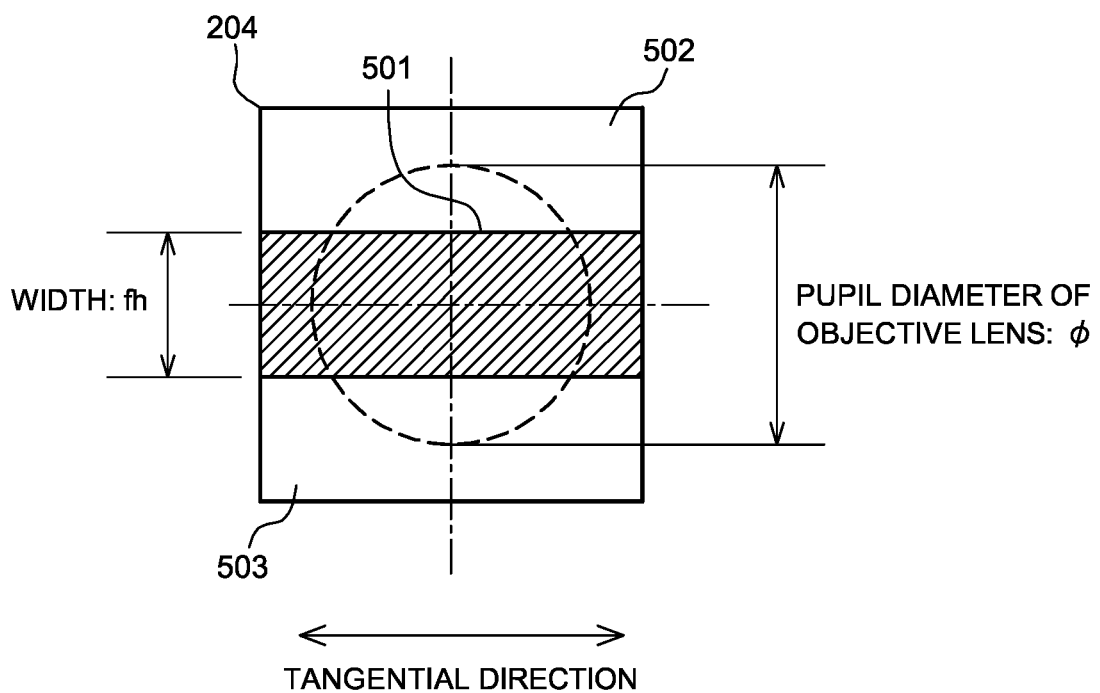
FIG. 10 is a schematic view showing part of the reflex mirror in the optical pickup device in the second embodiment of this invention.

FIG. 9 is a schematic view showing part of the optical pickup device in the second embodiment. Whereas the objective lens and collimator lens are aligned in the radial direction in the optical pickup device in the first embodiment, in the second embodiment the objective lens 205 and the collimator lens 202 are aligned in the tangential direction in the optical pickup device, as shown in FIG. 9. In the second embodiment, the reflex mirror 204 is again disposed on the light path between the objective lens 205 and the collimator lens 202. As in the first embodiment, the surface structure of the 204 is such that the reflectance of the central region differs from the reflectances of the regions outside the central region. FIG. 10 is a schematic diagram illustrating the reflecting surface, structured with bands of different reflectances, that is formed on the reflex mirror 204 in the second embodiment. The reflecting surface of the reflex mirror 204 in the second embodiment is divided into rectangular regions 501, 502, and 503 with long sides parallel to the tangential direction. The surface structure is such that if the reflectance of the central region 501 is Ri and the reflectances of the regions 502 and 503 located outside the b501 are both equal to Ro, then the relationship between the reflectance Ri of region 501 and the reflectance Ro of regions 502 and 503 satisfies Ri/Ro<1. Region 501 is elongate in the tangential direction, the width fh of region 501 is less than the pupil diameter $\phi$ of the objective lens, and $0<fh/\phi<1$.

As in the first embodiment, even when a collimator lens with a focal length shorter than the focal length of the collimator lenses in common use is employed in order to reduce the size of the optical system by reducing the amount of collimator lens movement for spherical aberration correction, the optical pickup device structured as described above can reduce the focused spot diameter by using a reflex mirror with a reflecting surface having a band structure with regions of different reflectances. Degradation of reproduction performance can therefore be prevented.

| REFERENCE CHARACTERS | |
|---|---|
| 101 | optical disc |
| 102 | turntable |
| 103 | spindle motor |
| 104 | optical pickup device |
| 105 | movement means |
| 106 | matrix circuit |
| 107 | signal reproduction circuit |
| 108 | servo circuit |
| 109 | spindle control circuit |
| 110 | laser control circuit |
| 111 | sled control circuit |
| 112 | controller |
| 201 | optical integrated device |
| 202 | collimator lens |
| 203 | objective lens actuator |
| 204 | reflex mirror |
| 205 | objective lens |
| 206 | collimator lens actuator |
| 300 | semiconductor laser |
| 301 | active layer |

| REFERENCE CHARACTERS -continued | |
|---|---|
| 401, 501 | region |
| 402, 502 | region |
| 403, 503 | region |

What is claimed is:

1. An optical pickup device comprising:
   a laser light source;
   a collimating optical system for converting laser light emitted from the laser light source to parallel light;
   a focusing optical system for focusing the parallel light to which the laser light is converted onto an optical disc;
   a light detection unit for receiving returning light returning by reflection, from the optical disc, of the light focused by the focusing optical system, and outputting a detection signal; and
   a reflecting mirror disposed between the collimating optical system and the focusing optical system; wherein
   the reflecting mirror has a reflecting surface, the reflecting surface having a central region and first and second outside regions located outside the central region;
   the central region on the reflecting surface meets the first and second outside regions on the reflecting surface, at respective positions illuminated by the light focused by the focusing optical system, in two boundary lines parallel to a radial direction on the optical disc; and
   a ratio of a reflectance of the central region to reflectances of the first and second outside regions is defined by the following mathematical expression:

$$Ri/Ro < 0.44 \cdot \ln(x) - 0.70,$$

where Ri denotes the reflectance of the central region; Ro denotes the reflectances of the first and second outside regions; and x denotes a rim light intensity measured on a percentage basis, assuming that a value of Ri/Ro is equal to 1 with respect to a predetermined focused spot diameter on the optical disc.

2. The optical pickup device of claim 1, wherein the two boundary lines are spaced apart by a quantity less than a lens pupil diameter of the focusing optical system.

3. An optical disc device comprising:
   the optical pickup device of claim 1; and
   a signal reproduction circuit for reproducing information recorded on the optical disc on a basis of a signal output from the light detection unit in the optical pickup device.

4. The optical pickup device of claim 1, wherein the mathematical expression is satisfied under a condition that:
   the predetermined focused spot diameter is about 0.412 micrometers; and
   a value of fh/$\phi$ is equal to about 0.5 where $\phi$ denotes a pupil diameter of a objective lens of the focusing optical system, and fh denotes a width of the central region in a direction perpendicular to the radial direction.

* * * * *